(12) United States Patent
Watson et al.

(10) Patent No.: US 11,528,511 B2
(45) Date of Patent: Dec. 13, 2022

(54) METHODS AND SYSTEMS FOR LOADING DATA ONTO TRANSPORTATION VEHICLES

(71) Applicant: Panasonic Avionics Corporation, Lake Forest, CA (US)

(72) Inventors: Philip Watson, Lake Forest, CA (US); Steven Bates, Mission Viejo, CA (US); Dan Van Proyen, Everett, WA (US)

(73) Assignee: Panasonic Avionics Corporation, Irvine, CA (US)

( * ) Notice: Subject to any disclaimer, the term of this patent is extended or adjusted under 35 U.S.C. 154(b) by 255 days.

(21) Appl. No.: 16/716,066

(22) Filed: Dec. 16, 2019

(65) Prior Publication Data

US 2020/0314457 A1  Oct. 1, 2020

Related U.S. Application Data

(60) Provisional application No. 62/824,604, filed on Mar. 27, 2019.

(51) Int. Cl.
*H04N 21/214* (2011.01)
*B64D 11/00* (2006.01)
(Continued)

(52) U.S. Cl.
CPC ... *H04N 21/2146* (2013.01); *B64D 11/00155* (2014.12); *G06F 9/45558* (2013.01);
(Continued)

(58) Field of Classification Search
CPC ......... H04N 21/2146; H04N 21/25816; B64D 11/00155; G06F 9/45558; G06F 2009/4557; G06F 2009/45595; G06F 9/452; G06F 9/45533; H04L 47/825; H04L 63/0823; H04L 67/025; H04L 63/0272; H04L 67/10; H04L 67/06; H04L 67/12; H04W 12/03; H04W 12/069; H04W 12/35; H04W 84/06; H04B 7/18506; H04B 7/18508
See application file for complete search history.

(56) References Cited

U.S. PATENT DOCUMENTS 10,063,552 B2   8/2018  Pugh et al.
2003/0233329 A1*  12/2003  Laraki ................. H04L 67/20
                                                                   705/52

(Continued)

*Primary Examiner* — Benjamin R Bruckart
*Assistant Examiner* — Tien M Nguyen
(74) *Attorney, Agent, or Firm* — Loza & Loza, LLP; Tejinder Singh

(57) ABSTRACT

Methods and systems for a transportation vehicle are provided. One method includes initializing a first browser at an electronic device to communicate with a remote virtual loader having access to data for an in-flight entertainment (IFE) system of an aircraft; authenticating the first browser by the remote virtual loader; providing IFE data for the IFE system to the first browser by the remote virtual loader with an instruction to grant access to the IFE data by a second browser of the electronic device, the second browser authenticated by the IFE system to send information to the IFE system; and transferring the IFE data from the electronic device to the IFE system by the second browser that obtains access to the IFE data from the first browser in response to the instruction from the remote virtual loader.

20 Claims, 11 Drawing Sheets

(51) Int. Cl.
*H04L 9/40* (2022.01)
*G06F 9/455* (2018.01)
*H04L 47/70* (2022.01)

(52) U.S. Cl.
CPC ........ *H04L 47/825* (2013.01); *H04L 63/0823* (2013.01); *G06F 2009/4557* (2013.01); *G06F 2009/45595* (2013.01)

(56) References Cited

U.S. PATENT DOCUMENTS

2008/0005171 A1* 1/2008 Cameron ................ H04L 65/60
2019/0121963 A1* 4/2019 Coleman ............... H04L 63/101
2020/0068358 A1* 2/2020 Macrae ................ H04N 21/231

* cited by examiner

METHODS AND SYSTEMS FOR LOADING DATA ONTO TRANSPORTATION VEHICLES

CROSS-REFERENCE TO RELATED APPLICATION

This patent application claims priority under 35 USC § 119(e) to U.S. Provisional Patent Application Ser. No. 62/824,604 filed on Mar. 27, 2019, entitled "METHODS AND SYSTEMS FOR LOADING DATA ONTO TRANSPORTATION VEHICLES", the disclosure of which is incorporated herein by reference in its entirety.

TECHNICAL FIELD

The present disclosure relates to methods and systems for loading electronic data onto transportation vehicles.

BACKGROUND

Transportation vehicles, for example, aircraft, trains, buses, recreation vehicle, boats and other similar vehicles use computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today may have individualized functional equipment dedicated to a particular passenger seat, which can be utilized by the passenger, such as video and/or audio entertainment systems, adjustable seats, adjustable environmental controls, adjustable lighting, telephony systems, crew communication systems, and the like. Many commercial airplanes today may also have individualized video and audio entertainment systems, often referred to as "inflight entertainment" or "IFE" systems. Such systems may also be referred to as "inflight entertainment and communication" systems as well, and typically abbreviated as "IFEC" systems.

As one example of a function that a passenger may activate, entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally.

Conventional IFE systems typically use custom portable loading devices for loading data onto a server and then distributing the loaded data to seat devices of the IFE system via a seat distribution network. The portable loading devices are typically provided by the IFE system providers.

In conventional systems, a software tool is loaded onto a computer laptop. The software tool provides a passive background to download electronic data to the IFE system. To load data onto an aircraft, software files are typically transferred to the software tool via a portable storage device, for example, a universal serial bus (USB) device. Some aircraft manufacturers do not allow portable devices to load data due to security concerns. Continuous efforts are being made to develop computing and networking technology that would provide flexibility in securely downloading data onto an aircraft (or any other transportation vehicle) without having to use custom hardware devices or portable media devices.

SUMMARY

Methods and systems for a transportation vehicle are provided. In one aspect, one method includes initializing a first browser at an electronic device to communicate with a remote virtual loader having access to data for an in-flight entertainment (IFE) system of an aircraft; authenticating the first browser by the remote virtual loader; providing IFE data for the IFE system to the first browser by the remote virtual loader with an instruction to grant access to the IFE data by a second browser of the electronic device, the second browser authenticated by the IFE system to send information to the IFE system; and transferring the IFE data from the electronic device to the IFE system by the second browser that obtains access to the IFE data from the first browser, in response to the instruction from the remote virtual loader.

In another aspect of the present disclosure, yet another method is provided. The method includes transmitting a request by an application of an electronic device to a remote virtual loader for data for an IFE system of an aircraft, the application paired with the IFE system and authorized to send data to the IFE system; creating a virtual tunnel between the remote virtual loader and the electronic device; using the virtual tunnel to transfer IFE data to the electronic device for the IFE system in response to the request; and transferring the IFE data from the electronic device to the IFE system for distribution within the aircraft.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter. Conditional processing/routing may be expressed by either if or when qualifiers, which are used interchangeably herein and intended to have the same meaning.

Figure 1A:
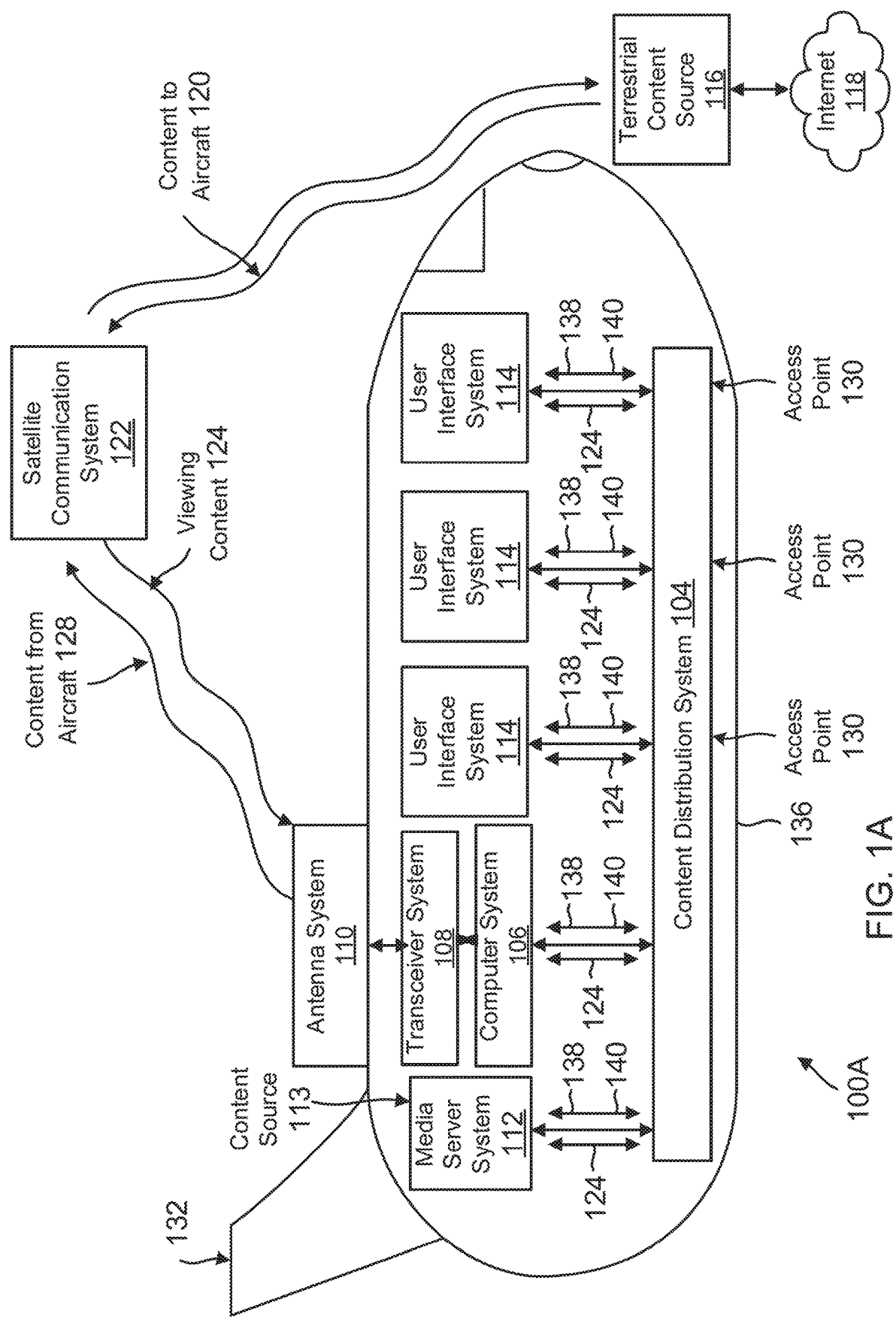
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132 for using the innovative technology described herein, according to one aspect of the present disclosure. When installed on an aircraft, system 100A can comprise an aircraft passenger in-flight entertainment (IFE) system, such as the Series 2000, 3000, eFX, eX2, eX3, eXW, NEXT, and/or any other inflight entertainment system developed and provided by Panasonic Avionics Corporation (without derogation of any trademark rights of Panasonic Avionics Corporation) of Lake Forest, Calif., the assignee of this application, or any other entity.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system.

The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content 124 as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100A. The computer system 106 can provide the received content 120 to the media (or content) server system 112 and/or directly to one or more of the user interfaces 114 as viewing content 124.

Although shown and described as being separate systems for purposes of illustration, the computer system 106 and the media server system 112 can be at least partially integrated.

The user interface system 114 may be computing terminals in communication with an access point 130. The user interface system 114 provides a display device to view content. In one aspect, the user interface system 114 includes a hardware interface to connect to an access point 130 that provides a wired and/or a wireless connection for the user interface system.

In one aspect, the user interface system 114 comprises a processor executable application that a user downloads and installs to receive and view content via an access point 130. The user interface system 114 may also include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

In one aspect, portions of viewing content 124 and software files for the IFE system are pre-loaded onto media server system 112, using the systems of FIGS. 3-5 and the process flows of FIGS. 6A-6D, described below in detail.

Figure 1B:
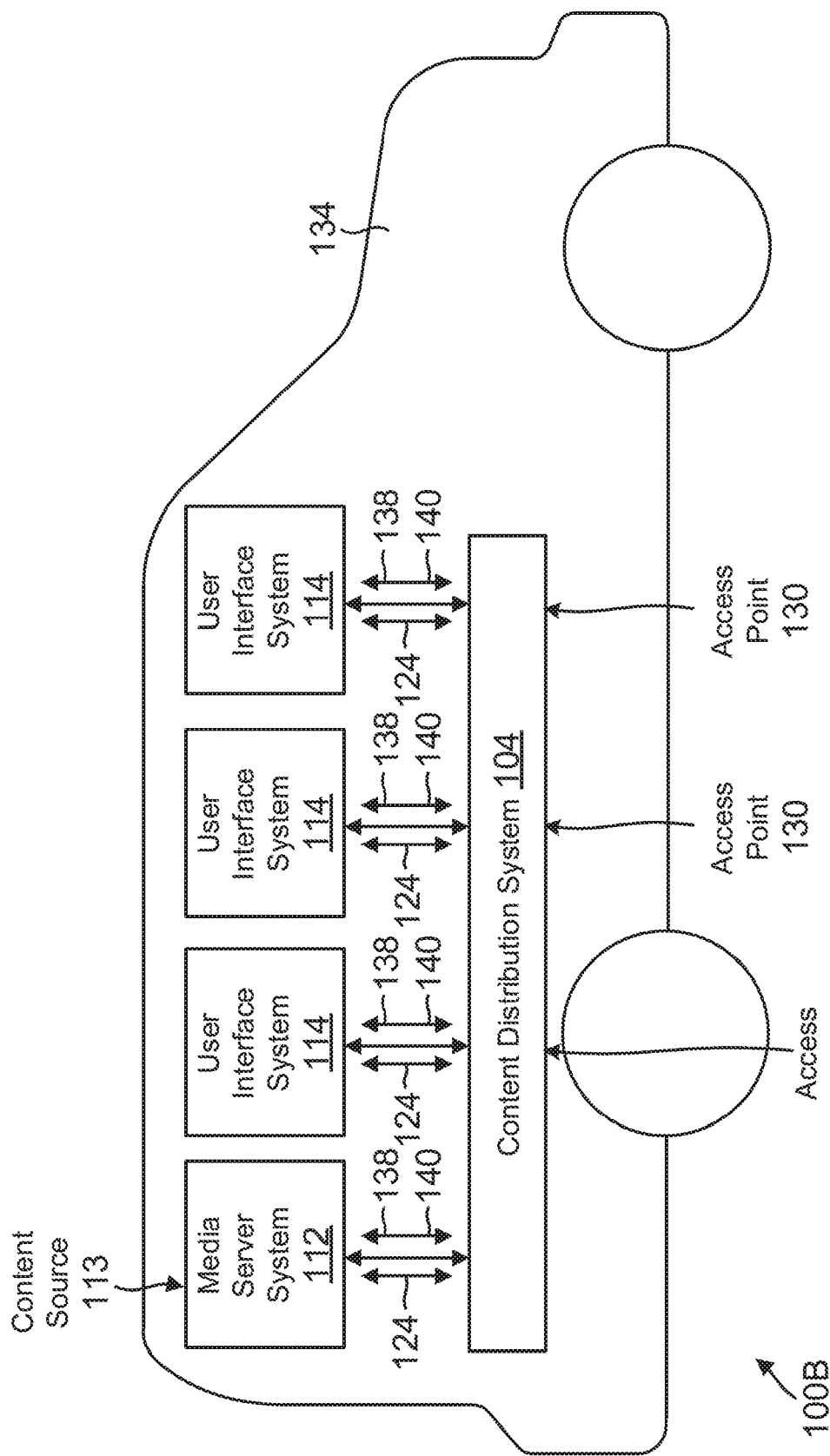
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
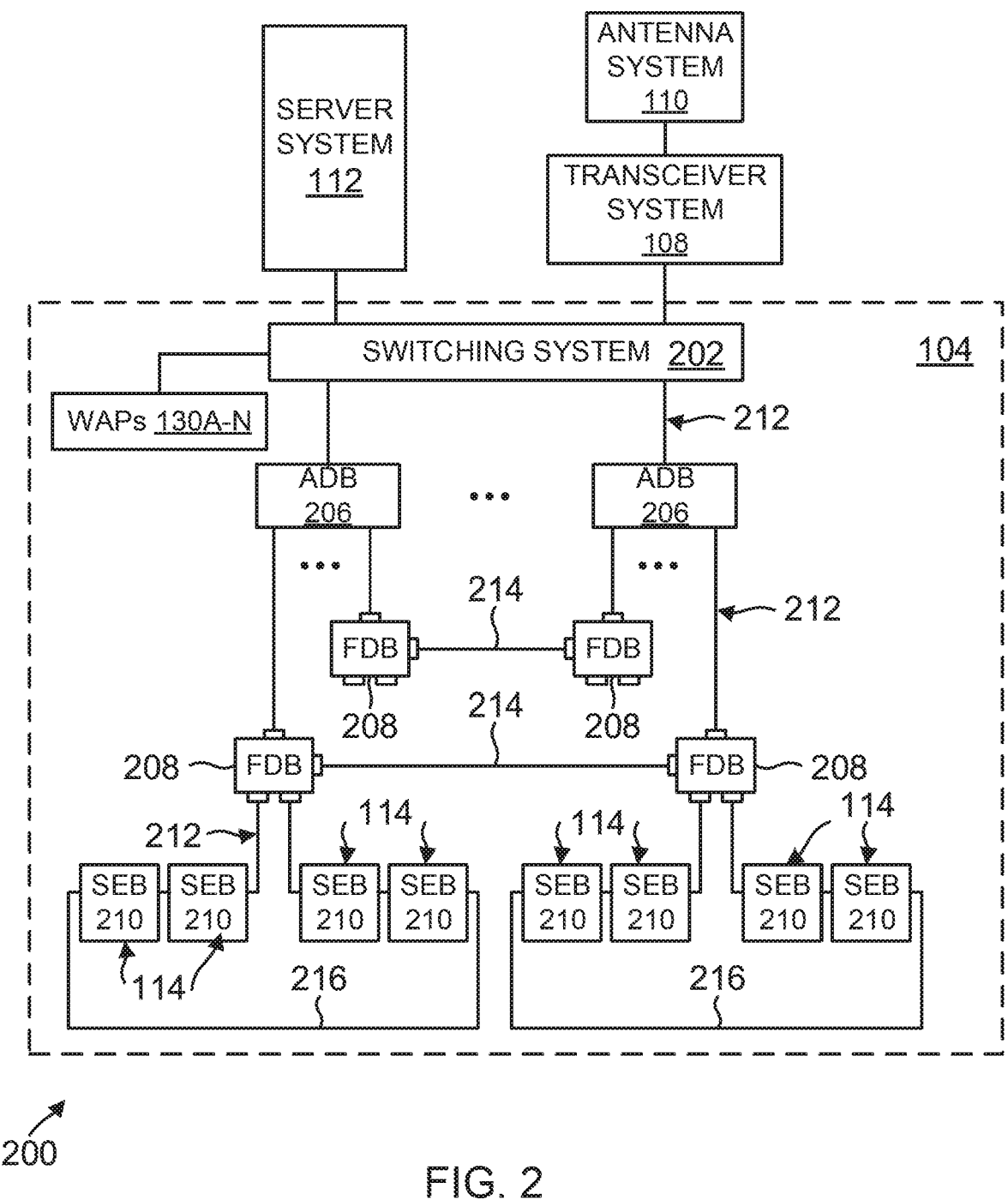
FIG. 2 shows an example of a content distribution system on an aircraft, used according to one aspect of the present disclosure.

Content Distribution System:

FIG. 2 illustrates an example of the content distribution system (may also be referred to as a distribution system, a seat distribution network or a distribution network) 104 for the vehicle information system 200 (similar to 100A/100B), according to one aspect of the present disclosure. The content distribution system 104 couples, and supports communication between the server system 112, and the plurality of user interface systems 114. Content for the content distribution system is received from the server system 112 that receives the content via a cloud based system, described below in detail.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T/100 Base-T1) communication network and/or Gigabit (such as 1000 Base-X and/or 1000 Base-T/1000Base-T1) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the content distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central area distribution box 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the area distribution boxes 206, the FDBs 208, the SEBs (and/or VSEBs), and/or PSEBs) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of SEBs 210 for a selected FDB 208 as shown in FIG. 2. Each SEB loopback connection 216 therefore forms a loopback path among the daisy-chained SEBs 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3:
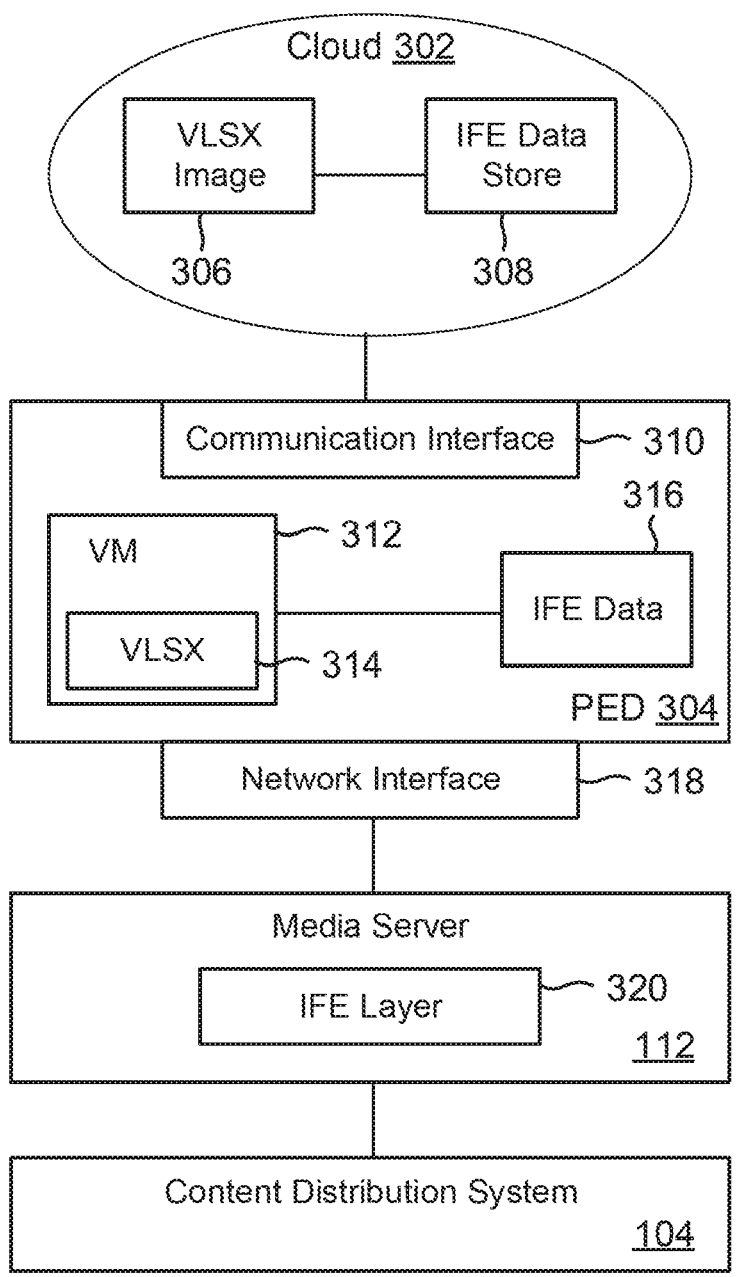
FIG. 3 shows a block diagram of a system for loading electronic data onto an aircraft, according to one aspect of the present disclosure.

System 300:

FIG. 3 shows a system 300 where an electronic device (also referred to as a personal electronic device ("PED")) 304 interfaces with cloud 302 and the media server 112 for distributing electronic data (e.g., media content, software updates, structured and/or unstructured information) to seat devices of an aircraft. The term "cloud" is intended to refer to a network, for example, the Internet, in which cloud computing allows shared resources, for instance, electronic data (such as software and information) to be available on-demand (assuming a wired or wireless connectivity to the cloud is available). Cloud 302 provides an abstraction between computing resource and its underlying technical architecture (e.g., servers, storage, networks), enabling convenient, on-demand network access to a shared pool of configurable computing resources that can be rapidly provisioned and released with minimal management effort or service provider interaction.

Typical cloud computing providers deliver applications online which are accessed from another web service or software such as a web browser, while the electronic data can be stored remotely on servers. The cloud computing architecture uses a layered approach for providing application services. A first layer is an application layer that is executed at client computers. After the application layer, cloud platform and cloud infrastructure is provided, followed by a server layer including hardware and computer software designed for cloud specific services.

In one aspect, cloud 302 may be provided by Amazon Web Services (AWS) (without derogation of any trademark rights). However, the adaptive aspects may be implemented using other cloud platforms, such Microsoft Azure, Google Cloud, and/or other cloud service providers. AWS provides a collection of on-demand public cloud services in different categories, including compute, storage, and database services.

Cloud 302 may also leverage an "AWS Elastic Compute Cloud" that may also be referred to as "AWS EC2", a service providing scalable compute capacity in the AWS cloud. A virtual machine (VM) in AWS EC2 is packaged and deployed as an Amazon Machine Image (AMI) file. In one aspect, cloud 302 may include the use of an AWS Virtual Private Cloud (VPC), a service that enables configuration of a logically isolated section of the AWS cloud providing secured access.

In one aspect, cloud 302 stores an image of a virtual loader system (VLSX) 306 and an IFE data store 308 that is used to store IFE data. The IFE data store 308 is a logical representation of the IFE data in the cloud 302. The physical IFE data may be stored at any location, accessed via a network connection. In one aspect, the IFE data may include IFE software, IFE software updates, media files, or any other information used by the IFE system. The IFE software may include IFE libraries and routines used by an IFE layer 320 executed by the media server 112. The IFE software may vary based on the type of IFE hardware and system used by an aircraft. It is noteworthy that the IFE data store 308 may store data and software as objects using object based storage, rather than traditional files managed by file systems. The adaptive aspects described herein are not limited to any specific structure of the IFE data store 308.

The VLSX image 306 may be stored as a "Docker" image file. Docker is a software framework for building and running virtual machines (VMs) using the Linux kernel (without derogation of any third party trademark rights). A Docker container is typically used for using an associated image file. A Docker container is an active or running instantiation of a Docker image. Each Docker container provides isolation and resembles a lightweight VM. However, Docker can be used without the overhead of a virtual machine monitor (e.g. a Hypervisor). It is noteworthy that many Docker containers can run simultaneously on the same Linux based computing system.

In one aspect, the VLSX image 306 and the IFE data are downloaded to the PED 304. The VLSX 314 is then executed in a virtual machine (VM) environment. FIG. 3 illustrates VLSX 312 executing/running within VM 312.

Typically, in a virtual machine environment a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software". In addition, resources available within the VM may be referred to herein as "guest resources."

The guest software expects to operate as if it were running on a dedicated computer rather than in a VM. That is, the guest software expects to control various events and have access to hardware resources on a physical computing system (e.g., a PED 304). The hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, PED 304 includes or interfaces with a virtual machine monitor (VMM) (not shown), for example, a processor executed, Hyper-V layer provided by Microsoft Corporation of Redmond, Wash. (without derogation of any third party trademark rights), a Hypervisor layer provided by VMWare Inc. (without derogation of any third party trademark rights), or any other type. The VMM manages a plurality of guest OSs and may also include or interface with a virtualization layer (VIL) (not shown) that provides one or more virtualized hardware resources to the guest OS of VM 312.

It is noteworthy that different vendors provide different virtualization environments, for example, Microsoft Corporation and VMware Corporation, providing Hyper-V and Hypervisor based virtual environments, respectively. The generic virtualization environment of FIG. 3 may be customized depending on the virtual environment to implement the various aspects of the present disclosure.

In one aspect, PED 304 connects to the IFE system (or the IFE layer 320) via a network interface 318. The IFE layer 320 provides an IFE system identifier to the VLSX 314. PED 304 provides the system identifier to a cloud based system via a communication interface 310. Based on the IFE system identifier, an appropriate VLSX image 306 and the relevant IFE data 316 from the IFE data store 308 are downloaded to PED 304. The IFE data 316 is then provided to the IFE layer 320 via the network interface 318. The IFE data 316 is distributed in the aircraft via the content distribution system 104 (or 200) described above in detail.

It is noteworthy that communication interface 310 and network interface 318 include hardware and logic for interfacing with cloud 302 and media server 112, respectively. The hardware and logic will vary based on the protocols and standards used for network communication, including Ethernet based protocols or any other protocol. As an example, communication interface 310 and network interface 318 include one or more ports that receive and transmit data. The interface 310 and 318 also include a processor, memory and storage with firmware instructions for controlling the overall operations of the interface for sending and receiving data. Details of using system 300 are provided below with respect to FIG. 6A.

Figure 4:
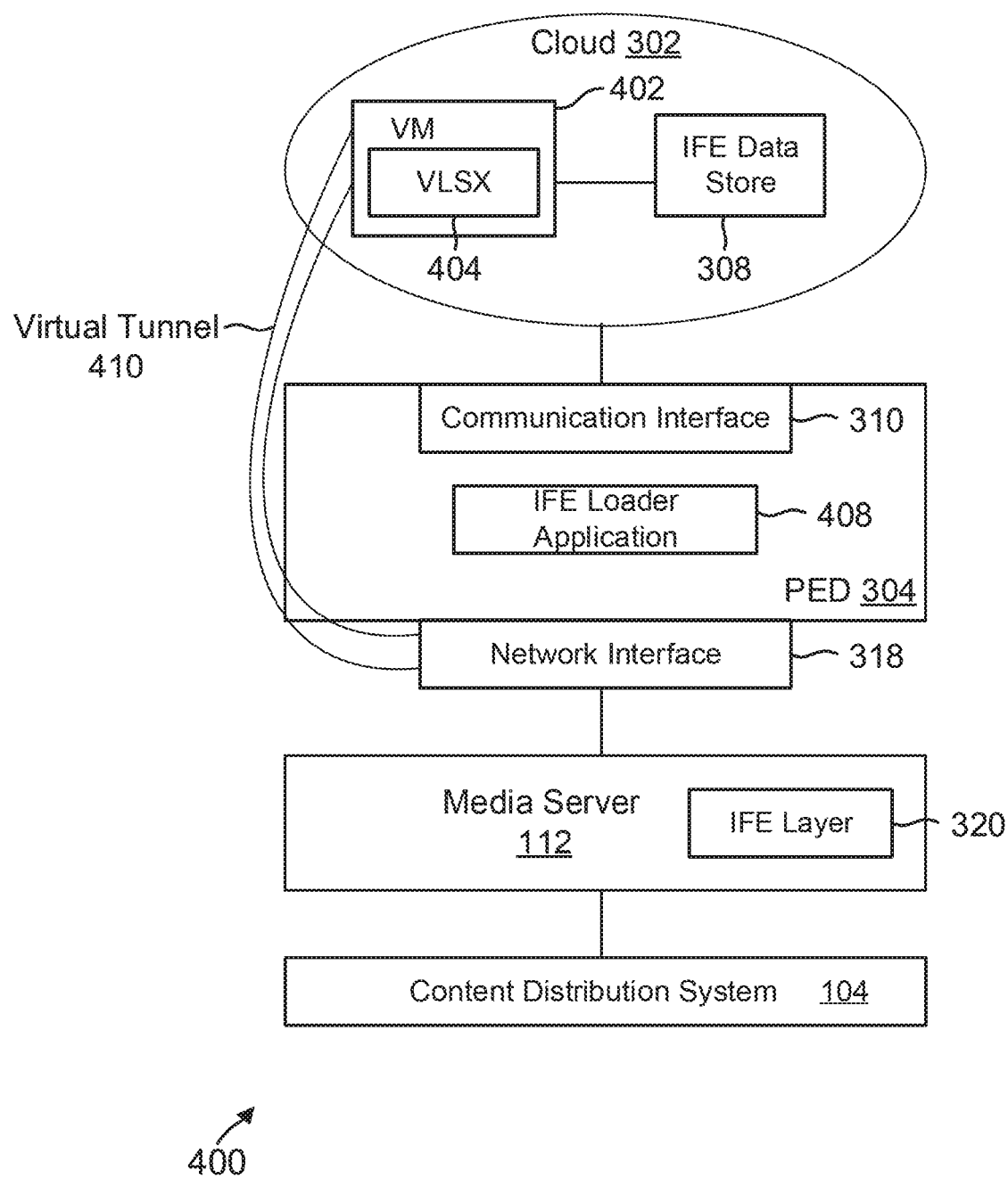
FIG. 4 shows a block diagram of another system for loading electronic data onto an aircraft, according to one aspect of the present disclosure.

System 400:

FIG. 4 shows an example of a system 400 where VLSX 404 is executed by VM 402 within cloud 302, in another aspect of the present disclosure. VLSX 404 has access to the IFE data store 308. The PED 304 executes an IFE loader application 408 that interfaces with VLSX 404. The IFE loader application 408 may be a custom application with local privileges to modify PED 304 network configurations to match the parameters needed to interface with media server 112. The parameters may include IP (Internet protocol) addresses, VLAN (virtual local area network) identifiers or any other parameters that may be used to interface with media server 112. The IFE loader application 408 may provide a browser to interface with VLSX 404 in the cloud 302.

In one aspect, the IFE loader application 408 may be stored on a non-transitory storage medium, such as a hard drive, CD, CD-ROM, DVD, flash memory, or any other storage device (volatile or non-volatile), etc. For example, the IFE loader application 408 may be stored on a storage device of an application store ("App Store") (not shown) such as that operated by Apple, Inc. under the trademark ITUNES, the application store operated by Google, Inc. under the trademark GOOGLE PLAY, or the application store operated by Microsoft Corporation under the trademark WINDOWS STORE. Alternatively, the app store may be a website server for a website operated by a provider of an on-board management system such as the manufacturer or a carrier operating the vehicle (e.g., a commercial airline, train operator, cruise line, bus line, etc.).

The IFE loader application 408 downloads IFE data from the cloud 302 and provides the IFE data to media server 112 via the network interface 318, as described below in detail.

In one aspect, the IFE loader application 408 is paired with the IFE layer 320 and sends a request to VLSX 404 for the IFE data. The term "pair" means that the IFE loader application 408 is associated and authenticated by the media server 112 to send and receive information. The request may provide information regarding the IFE system type. VLSX 404 creates a virtual tunnel 410 for downloading the IFE data from the cloud 302 to PED 304. Once the IFE data has been received by the PED 304, the data is transferred from network interface 318 to media server 112 for distribution. Details of using system 400 are provided below with respect to FIG. 6B.

Figure 5:
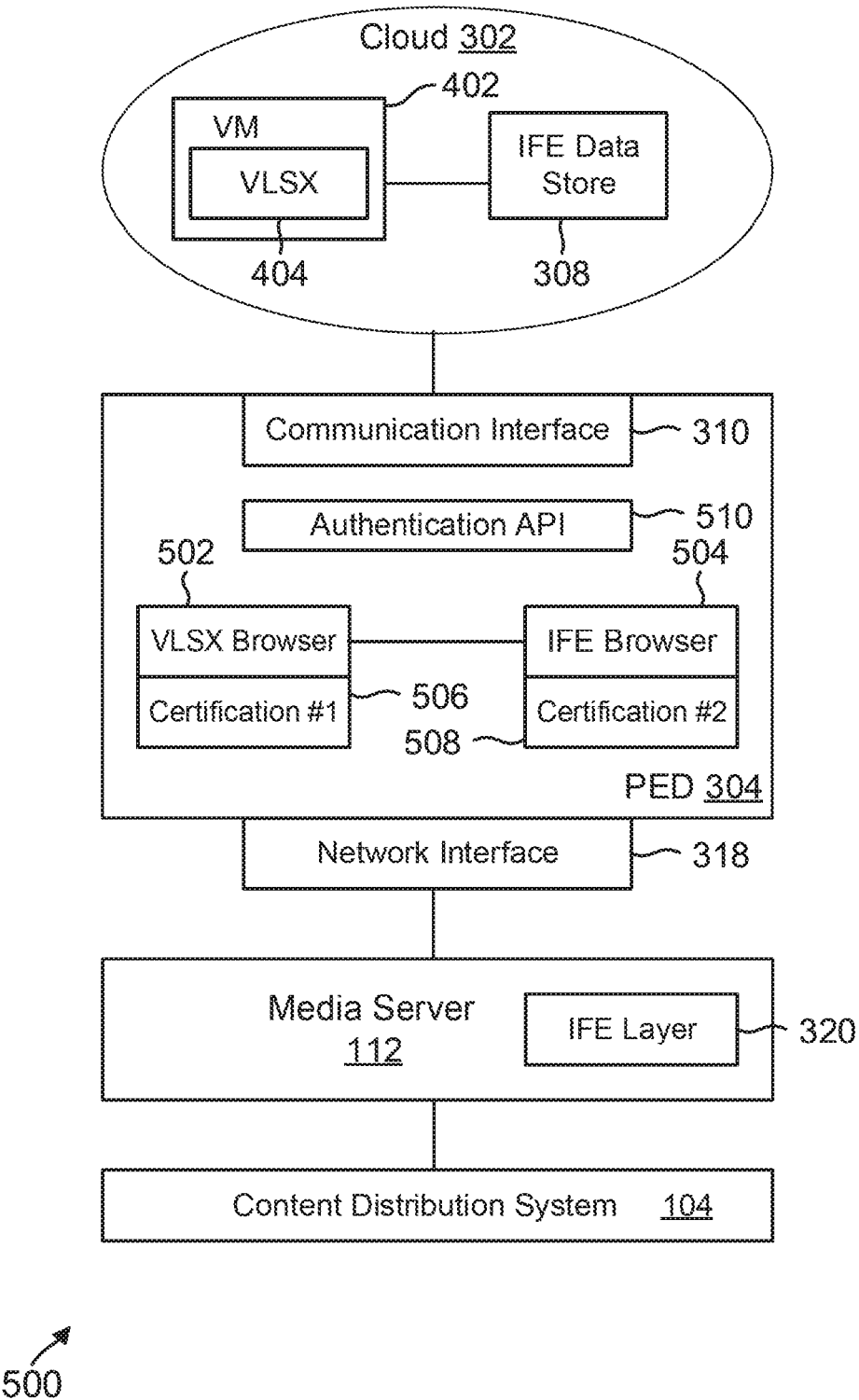
FIG. 5 shows a block diagram of yet another system for loading electronic data onto an aircraft, according to one aspect of the present disclosure.

System 500:

FIG. 5 shows a system 500 where a loader application of system 400 is not used, according to yet another aspect of the present disclosure. In one aspect, in system 500, PED 304 executes a VLSX browser 502 (may be referred to as browser 502) and an IFE browser 504 (may be referred to as browser 504). Browser 502 is provided with certificate 506 to interface with VLSX 404, while browser 504 is provided with certificate 508 to interface with media server 112 and the IFE layer 320. Certificates 506 and 508 are electronic signatures/documents using public key infrastructure (PKI) keys to identify an individual, a server, a company, or any other entity. Certificates 506 and 508 are authentication tools to enable communication between two or more applications. Certificates 506 and 508 may be issued by certificate authorities (CAs) (not shown), which are entities that validate and issue certificates.

In one aspect, an authentication API 510 is presented to a user for authentication by media server 112. Browser 504 is initialized using a URL (uniform resource locator) that is associated only with the IFE system of the aircraft. The certificate 508 can be embedded within the URL. Browser 504 connects to the IFE system (e.g., IFE layer 320) using a secured encrypted connection.

To initiate communication with VLSX 404, browser 502 is initialized and connects to cloud 302. Browser 502 provides certificate 506 to VLSX 404 for authentication. Browser 502 also requests IFE data from VLSX 404. VLSX 404 sends the IFE data to browser 502 with a command instructing browser 502 to provide access to the IFE data to browser 504. Browser 502 and 504 can communicate with each other using sockets, cookies, JavaScript or via local files. It is noteworthy that enabling browsers 502 and 504 to communicate with each other is novel and non-obvious because conventional browsers are not designed to communicate with each other for privacy reasons.

In another aspect, when browser 504 is initialized, it receives an IFE identifier from media server 112. Browser 504 provides the identifier to browser 502 that interfaces with VLSX 404 to receive IFE data specific to the IFE system. The IFE data is provided to browser 502, which is then provided to browser 504. The IFE data is then provided to media server 112 for distribution using a seat distribution network.

In one aspect system 500 does not use any specific application or software for loading IFE data to media server 112. Details of using system 500 are provided below with respect to FIGS. 6C-6D.

Figure 6A:
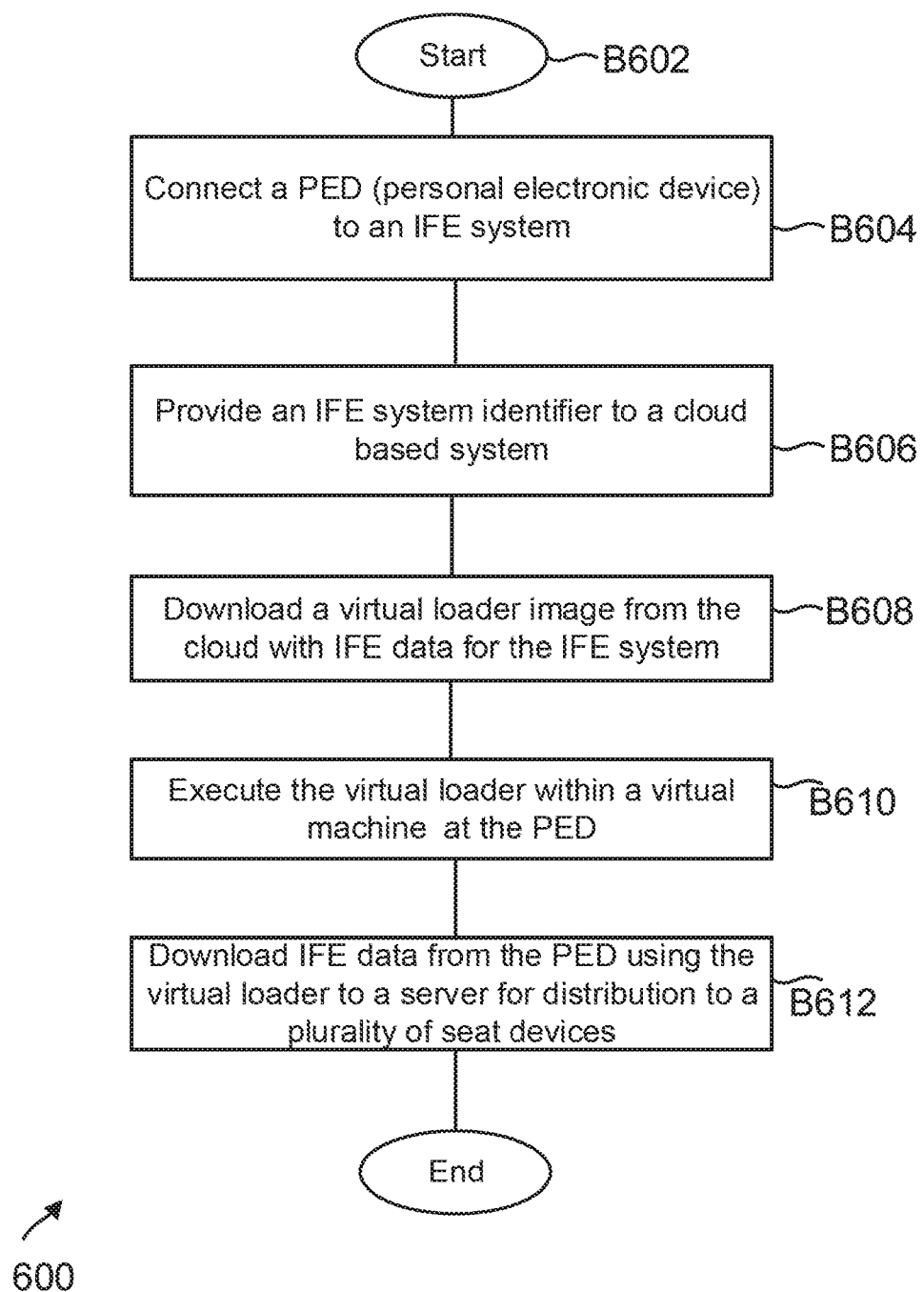
FIG. 6A shows a process for using the system of FIG. 3, according to one aspect of the present disclosure.

Process Flows:

FIG. 6A shows a process 600 for using system 300, according to one aspect of the present disclosure. Process 600 starts in block B602 when the cloud 302, PED 304 and media server 112 have been initialized. In block B604, PED 304 is connected to the media server 112. PED 304 goes through an authentication process to interface with the media server 112 by providing security credentials. Upon authentication, PED 304 retrieves an IFE system identifier that identifies the IFE system deployed at aircraft 132. The identifier may indicate the type of hardware and software that is being used by the IFE system.

In block B606, the PED 304 provides the identifier to a cloud based system via the communication interface 310. In one aspect, the cloud based system may be a cloud manager device that manages the cloud 302.

Based on the type of IFE system that is being used by the aircraft, in block B608, the VLSX image 306 is downloaded via a network connection to the PED 304. IFE data from IFE data store 308 corresponding to the IFE identifier is also provided to PED 304 and stored as IFE data 316. Thereafter, in block B610, the VLSX 314 is executed at PED 304 within VM 312.

In block B612, the IFE data 316 is provided to media server 112 via network interface 318. The media server 112 then provides the IFE data 316 to the content distribution system 104 for distribution.

Figure 6B:
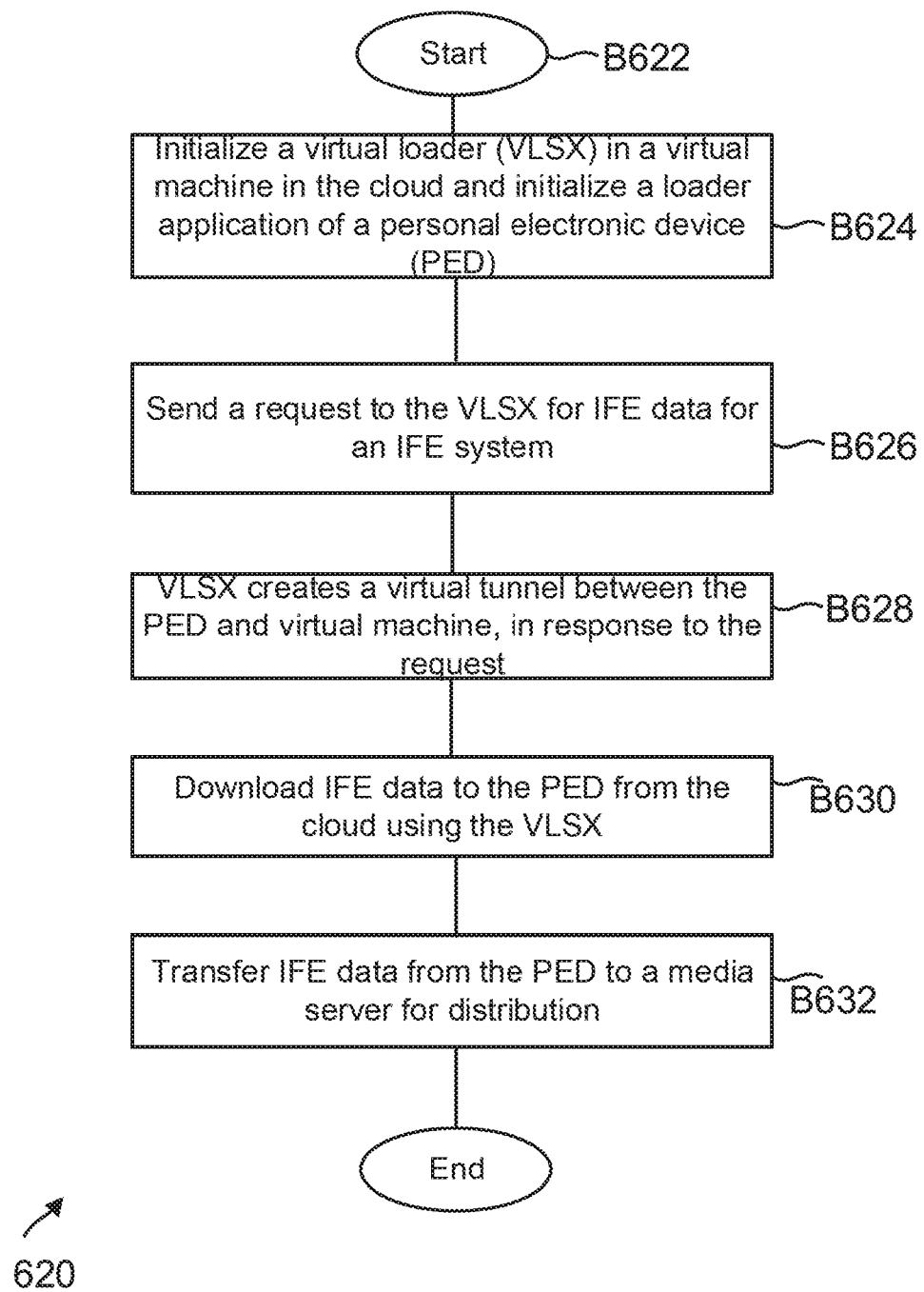
FIG. 6B shows a process for using the system of FIG. 4, according to one aspect of the present disclosure.

FIG. 6B shows a process 620 for using system 400 of FIG. 4, according to one aspect of the present disclosure. Process 620 begins in block B622, when the cloud 302, PED 304 and media server 112 are operational and initialized. In block B624, VM 402 with the VLSX 404 is initialized in the cloud 302. The IFE loader application 408 is also initialized at PED 304.

In block B626, the IFE loader application 408 sends a request to VLSX 404 for IFE data. In block B628, a virtual tunnel 410 is created to transfer the IFE data securely to PED 304. In block B630, the IFE data is downloaded to PED 304, and in block B632, the IFE data is transferred to the media server 112 via the network interface 318 for distribution.

In one aspect of the present disclosure, a method is provided. The method includes transmitting a request by an application (e.g., 408) of an electronic device (e.g., 304) to a remote virtual loader (e.g. 404) for data for an IFE system (e.g., 320) of an aircraft, the application paired with the IFE system and authorized to send content to the IFE system; creating a virtual tunnel (e.g., 410) between the remote virtual loader and the electronic device; using the virtual tunnel to transfer IFE data to the electronic device for the IFE system in response to the request; and transferring the IFE data from the electronic device to the IFE system for distribution within the aircraft.

In one aspect, the remote virtual loader is executed within a virtual machine (e.g., 402) of a cloud based system (302). The IFE data is provided by the electronic device to a server (e.g., 112) for distribution, using a distribution network (e.g., 200). The application provides an IFE system identifier to the remote virtual loader for the IFE data. The remote virtual loader retrieves the IFE data based on the IFE system identifier. The virtual tunnel links the remote virtual loader with a port (e.g., 318) of the electronic device, the port used to transfer the IFE data to the IFE system.

Figure 6C:
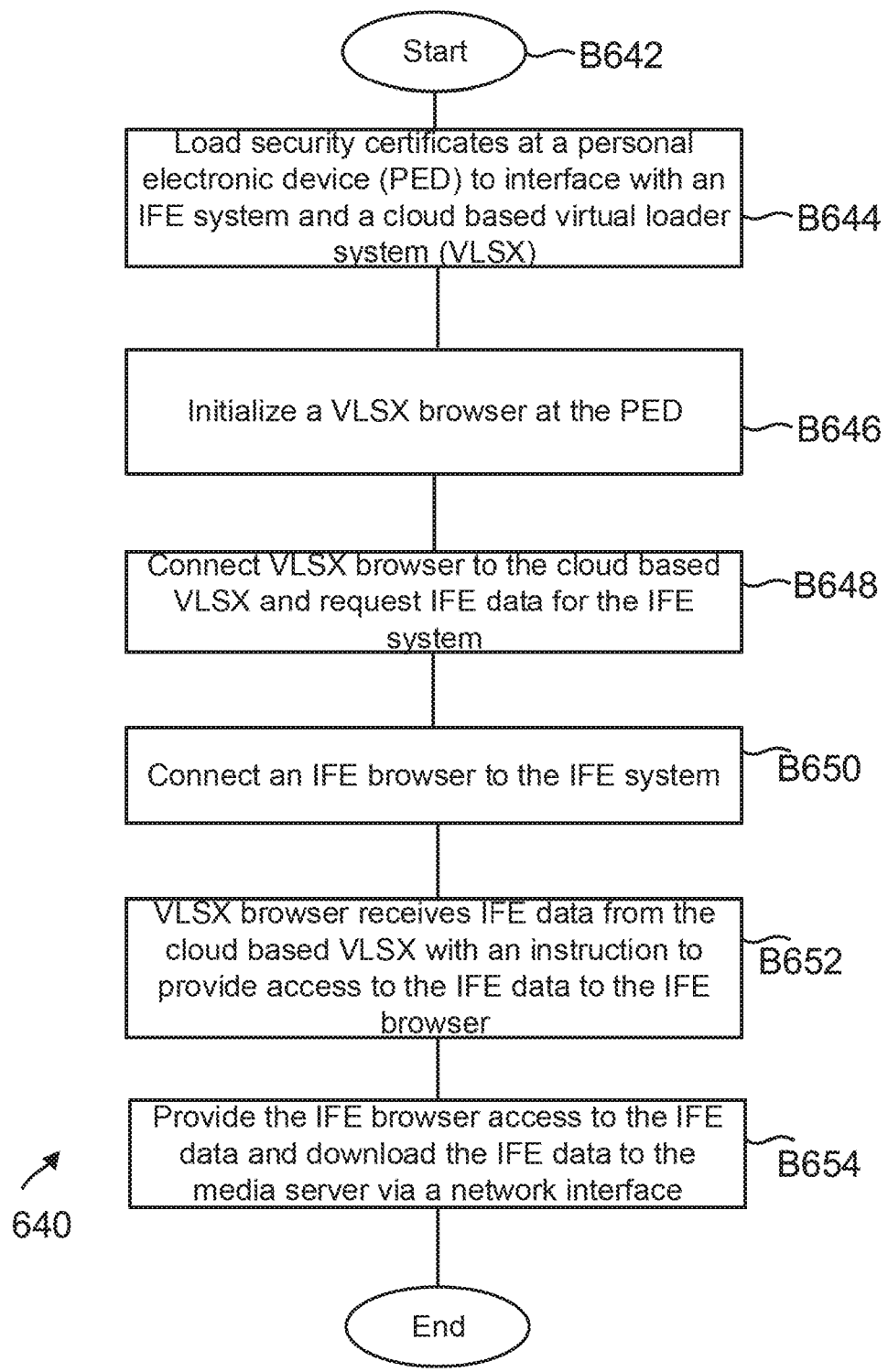
FIG. 6C shows a process for using the system of FIG. 5, according to one aspect of the present disclosure.

FIG. 6C shows a process 640 for using system 500 of FIG. 5, according to one aspect of the present disclosure. The process begins in block B642, when the cloud 302, PED 304 and media server 112 are initialized and operational.

In block B644, certificates 506 and 508 are loaded onto PED 304 so that the PED 304 can communicate with both the cloud 302 and the media server 112. In block B646, browser 502 is initialized using API 510 and certificates 506. In block B648, browser 502 connects to VM 402 and provides the certificate 506 to VLSX 404 for authentication. The browser 502 also provides an identifier associated with the IFE system and browser 504 to VLSX 404.

In block B650, browser 504 is initialized using API 510. Thereafter, browser 504 connects to media server 112 using certificate 508.

In block B652, browser 502 receives the IFE data from the IFE data store 308 with a command instructing browser 502 to provide access to the IFE data to browser 504. The IFE data is specific to the IFE system used by the aircraft. In one aspect, IFE data received by browser 502 is stored at a memory of PED 304. Browser 502 notifies browser 504 of the memory location (e.g., by a pointer). The IFE data is then accessed by browser 504 and sent to the media server 112 for distribution, in block B654.

Figure 6D:
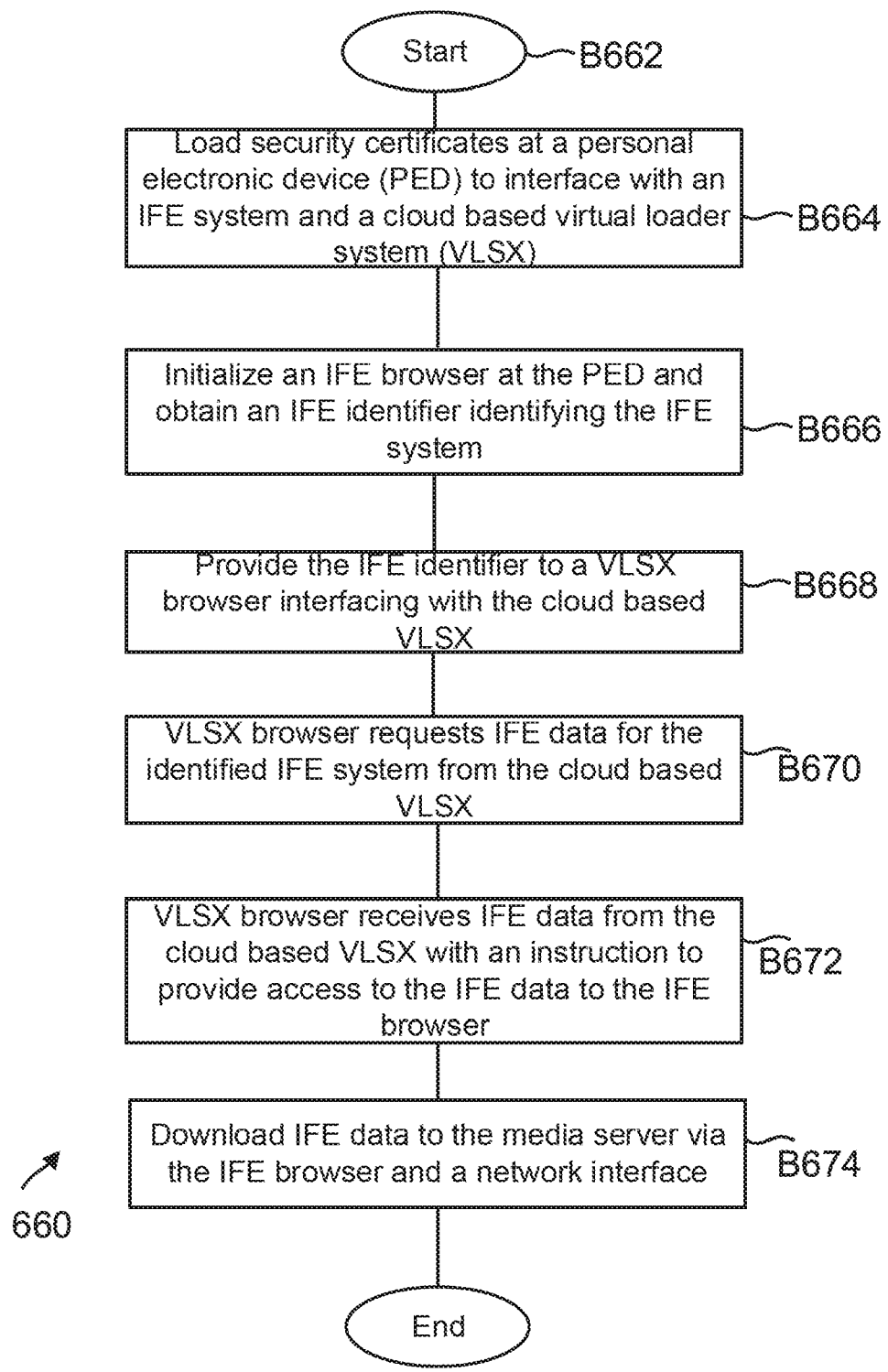
FIG. 6D shows another process for using the system of FIG. 5, according to one aspect of the present disclosure.

FIG. 6D shows another process 660 for using system 500, according to one aspect of the present disclosure. The process begins in block B662, when the cloud 302, PED 304 and the media server 112 are initialized and operational. In block B664, certificates 506 and 508 are loaded onto PED 304 so that PED 304 can communicate with the cloud 302 and the media server 112.

In block B666, browser 504 is initialized using API 510 and presents certificates 508 to the media server 112. Upon authentication, media server 112 provides an identifier identifying the deployed IFE system at the aircraft. The identifier provides an indication of what type of IFE software and data files need to be downloaded from the IFE data store 308.

In block B668, browser 504 provides the identifier to browser 502 that interfaces with VLSX 404 after being authenticated. Browser 502 uses certificates 506 to securely communicate with VLSX 404.

In block B670, browser 502 provides the IFE system identifier to VLSX 404 and requests the IFE data for the identified IFE system.

In block B672, VLSX 404 uses the IFE system identifier to select IFE data from the IFE data store 308. VLSX 404 provides the IFE data to browser 502 with a command instructing browser 502 to grant access to the IFE data to browser 504. In one aspect, IFE data received by browser 502 is stored at a memory of PED 304. Browser 502 notifies browser 504 of the memory location (e.g., by a pointer).

In block B674, browser 504 accesses the downloaded IFE data and sends the IFE data to media server 112 via network interface 318 for distribution within the aircraft.

In one aspect, methods and systems for a transportation vehicle are provided. One method includes initializing a first browser (e.g., 502) at an electronic device to communicate with a remote virtual loader (e.g., 404) having access to data for an IFE system of an aircraft; authenticating the first browser by the remote virtual loader; providing IFE data for the IFE system to the first browser by the remote virtual loader with an instruction to grant access to the IFE data by a second browser (e.g., 504) of the electronic device, the second browser authenticated by the IFE system (e.g., 320) to send information to the IFE system; and transferring the IFE data from the electronic device to the IFE system by the second browser that obtains access to the IFE data from the first browser in response to the instruction from the remote virtual loader.

In one aspect, the remote virtual loader is hosted by a virtual machine (e.g., 402) in a cloud based system (e.g., 302). The first browser uses a first certificate (e.g., 506) stored by the electronic device for authentication by the remote virtual loader. The second browser uses a second certificate (e.g., 508) stored at the electronic device for authentication by the IFE system. The second browser provides an IFE system identifier to the first browser for obtaining access to the IFE data. The first browser provides the IFE system identifier to the remote virtual loader with a request for the IFE data. The IFE data from the second browser is received by a server (e.g., 112) of the IFE system and distributed to a plurality of seat devices via a seat distribution network (e.g., 200).

In one aspect, the processes and systems described herein provide an efficient virtual loader tool that can be accessed from anywhere with a network connection. Specialized hardware is not required as long as proper authentication digital certificates are used for authentication and loading content.

Figure 7:
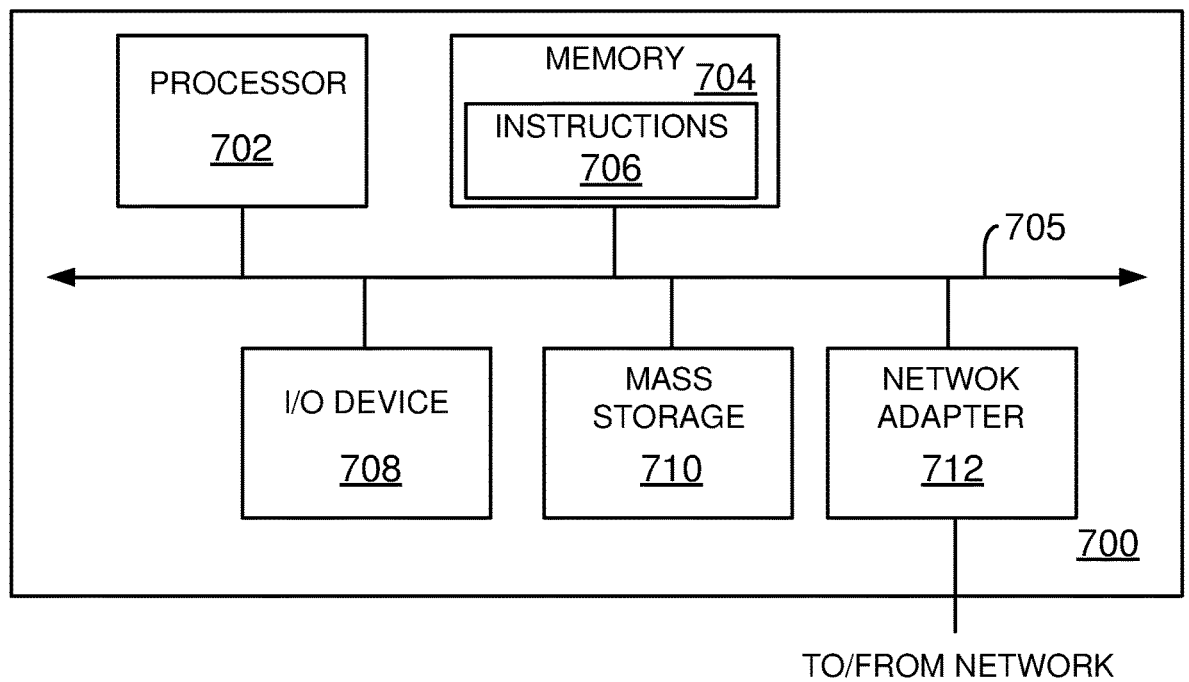
FIG. 7 shows a block diagram of a computing system, used according to one aspect of the present disclosure.

Processing System:

FIG. 7 is a high-level block diagram showing an example of the architecture of a processing system 700 that may be used according to one aspect. The processing system 700 can represent PED 304, media server 112, computing system 106, or any other device that attempts to interface with a vehicle computing device. Note that certain standard and well-known components which are not germane to the present aspects are not shown in FIG. 7.

The processing system 700 includes one or more processor(s) 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 702 are the central processing units (CPUs) of the processing system 700 and, thus, control its overall operation. In certain aspects, the processors 702 accomplish this by executing software stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 may be used to implement the process blocks of FIGS. 6A-6D described above.

Also connected to the processors 702 through the bus system 705 are one or more internal mass storage devices 710, and a network adapter 712. Internal mass storage devices 710 may be, or may include any conventional medium for storing large volumes of data in a non-volatile manner, such as one or more magnetic or optical based disks, flash memory, or solid-state drive.

The network adapter 712 provides the processing system 700 with the ability to communicate with remote devices (e.g., over a network and may be, for example, an Ethernet adapter or the like.

The processing system 700 also includes one or more input/output (I/O) devices 708 coupled to the bus system 705. The I/O devices 708 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for loading content on a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

initializing a first browser on an electronic device to communicate with a remote virtual loader having access to data for an in-flight entertainment (IFE) system of an aircraft, the electronic device securely paired to the IFE system on the aircraft;

authenticating the first browser by the remote virtual loader, the remote virtual loader executed remote to the aircraft;

receiving, by the first browser, IFE data specific to the IFE system from the remote virtual loader with an instruction to grant access to the received IFE data by a second browser of the electronic device, the second browser authenticated by the IFE system to send information to and receive information from the IFE system;

in response to the instruction from the remote virtual loader, notifying the second browser by the first browser, a storage location where the IFE data is stored by the first browser;

accessing, by the second browser, the IFE data stored by the first browser; and transferring the IFE data from the electronic device to the IFE system by the second browser.

2. The method of claim 1, wherein the remote virtual loader is hosted by a virtual machine in a cloud based system.

3. The method of claim 1, wherein the first browser uses a first certificate stored by the electronic device for authentication by the remote virtual loader.

4. The method of claim 1, wherein the second browser uses a second certificate stored at the electronic device for authentication by the IFE system.

5. The method of claim 1, wherein the second browser provides an IFE system identifier to the first browser for obtaining access to the IFE data.

6. The method of claim 5, wherein the first browser provides the IFE system identifier to the remote virtual loader with a request for the IFE data.

7. The method of claim 1, wherein the IFE data from the second browser is received by a server of the IFE system and distributed to a plurality of seat devices via a seat distribution network.

8. A non-transitory machine-readable storage medium having stored thereon instructions for performing a method, comprising machine executable code which when executed by at least one machine, causes the machine to:

initialize a first browser on an electronic device to communicate with a remote virtual loader having access to data for an in-flight entertainment (IFE) system of an aircraft, the electronic device securely paired to the IFE system on the aircraft;

authenticate the first browser by the remote virtual loader, the remote virtual loader executed remote to the aircraft;

receive, by the first browser, IFE data specific to the IFE system from the remote virtual loader with an instruction to grant access to the received IFE data by a second ebrowser of the electronic device, the second browser authenticated by the IFE system to send information to and receive information from the IFE system;

in response to the instruction from the remote virtual loader, notify the second browser by the first browser, a storage location where the IFE data is stored by the first browser;

access, by the second browser, the IFE data stored by the first browser; and transfer the IFE data from the electronic device to the IFE system by the second browser.

9. The storage medium of claim 8, wherein the remote virtual loader is hosted by a virtual machine in a cloud based system.

10. The storage medium of claim 8, wherein the first browser uses a first certificate stored by the electronic device for authentication by the remote virtual loader.

11. The storage medium of claim 8, wherein the second browser uses a second certificate stored at the electronic device for authentication by the IFE system.

12. The storage medium of claim 8, wherein the second browser provides an IFE system identifier to the first browser for obtaining access to the IFE data.

13. The storage medium of claim 12, wherein the first browser provides the IFE system identifier to the remote virtual loader with a request for the IFE data.

14. The storage medium of claim 8, wherein the IFE data from the second browser is received by a server of the IFE system and distributed to a plurality of seat devices via a seat distribution network.

15. A system, comprising:

an electronic device on an aircraft, the electronic device having a memory containing machine readable medium comprising machine executable code having stored thereon instructions for a first browser and a second browser; and a processor coupled to the memory, the processor configured to execute the machine executable code to:

initialize a first browser on an electronic device to communicate with a remote virtual loader having access to data for an in-flight entertainment (IFE) system of an aircraft, the electronic device securely paired to the IFE system on the aircraft;

authenticate the first browser by the remote virtual loader, the remote virtual loader executed remote to the aircraft;

receive, by the first browser, IFE data specific to the IFE system from the remote virtual loader with an instruction to grant access to the received IFE data by a second browser of the electronic device, the second browser authenticated by the IFE system to send information to and receive information from the IFE system;

in response to the instruction from the remote virtual loader, notify the second browser by the first browser, a storage location where the IFE data is stored by the first browser;

access, by the second browser, the IFE data stored by the first browser; and transfer the IFE data from the electronic device to the IFE system by the second browser.

16. The storage medium of claim 15, wherein the first browser uses a first certificate stored by the electronic device for authentication by the remote virtual loader.

17. The storage medium of claim 15, wherein the second browser uses a second certificate stored at the electronic device for authentication by the IFE system.

18. The storage medium of claim 15, wherein the second browser provides an IFE system identifier to the first browser for obtaining access to the IFE data.

19. The storage medium of claim 18, wherein the first browser provides the IFE system identifier to the remote virtual loader with a request for the IFE data.

20. The system of claim 15, wherein the IFE data from the second browser is received by a server of the IFE system and distributed to a plurality of seat devices via a seat distribution network.

\* \* \* \* \*